(12) United States Patent
Chandrasekaran et al.

(10) Patent No.: US 10,885,327 B2
(45) Date of Patent: Jan. 5, 2021

(54) EFFICIENT HANDLING OF DIGITAL MAP DATA DIFFERENCES

(71) Applicant: Uber Technologies, Inc., San Francisco, CA (US)

(72) Inventors: Sashikanth Chandrasekaran, Palo Alto, CA (US); Chi Su, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 53 days.

(21) Appl. No.: 16/279,959

(22) Filed: Feb. 19, 2019

(65) Prior Publication Data
US 2020/0242351 A1 Jul. 30, 2020

Related U.S. Application Data

(60) Provisional application No. 62/797,785, filed on Jan. 28, 2019.

(51) Int. Cl.
*G06K 9/00* (2006.01)
*G06K 9/62* (2006.01)
*G06T 11/60* (2006.01)
*G01C 21/32* (2006.01)

(52) U.S. Cl.
CPC ....... *G06K 9/00476* (2013.01); *G06K 9/6215* (2013.01); *G06T 11/60* (2013.01); *G01C 21/32* (2013.01)

(58) Field of Classification Search
CPC . G06T 19/003; G06T 19/006; G06K 9/00476; G06K 9/6215
See application file for complete search history.

(56) References Cited

U.S. PATENT DOCUMENTS

| 2008/0031610 A1* | 2/2008 | Border | H04N 5/23212 396/89 |
| 2010/0034422 A1* | 2/2010 | James | G06T 7/246 382/103 |
| 2010/0306249 A1* | 12/2010 | Hill | G06Q 50/01 707/769 |
| 2011/0310087 A1* | 12/2011 | Wright, Jr. | G06T 13/80 345/419 |

* cited by examiner

*Primary Examiner* — John J Lee
(74) *Attorney, Agent, or Firm* — Fenwick & West LLP

(57) ABSTRACT

Embodiments relate to a computing device retrieving an augmented map comprising a base map, an augmentation to a first map element, and a flag for the augmentation indicating a scope of the augmentation. The computing device receives an updated base map comprising the base map and an update to a second map element. The computing device performs a difference comparison between the augmented map and the updated base map based on the scope indicated by the flag. The computing device determines whether the augmentation and the update conflict based on the difference comparison. The computing device assembles a set of conflicts based on determination.

20 Claims, 8 Drawing Sheets

600

```
┌─────────────────────────────────────────────────────────────┐
│ Retrieve an augmented map that includes a base map, an      │
│ augmentation to a map element, and a flag for the           │
│ augmentation indicating a scope of the augmentation         │
│ 605                                                         │
└─────────────────────────────────────────────────────────────┘
                              │
                              ▼
┌─────────────────────────────────────────────────────────────┐
│ Receive an updated base map that includes the base map      │
│ and an update to a map element                              │
│ 610                                                         │
└─────────────────────────────────────────────────────────────┘
                              │
                              ▼
┌─────────────────────────────────────────────────────────────┐
│ Perform a difference comparison between the augmented map   │
│ and the updated base map based on the flag                  │
│ 615                                                         │
└─────────────────────────────────────────────────────────────┘
                              │
                              ▼
┌─────────────────────────────────────────────────────────────┐
│ Determine a set of local scope conflicts to map elements    │
│ based on the performed difference comparison                │
│ 620                                                         │
└─────────────────────────────────────────────────────────────┘
                              │
                              ▼
┌─────────────────────────────────────────────────────────────┐
│ Determine a set of neighborhood scope conflicts to map      │
│ elements based on the performed different comparison        │
│ 625                                                         │
└─────────────────────────────────────────────────────────────┘
                              │
                              ▼
┌─────────────────────────────────────────────────────────────┐
│ Assemble a set of conflicts based on the set of local scope │
│ conflicts and the set of neighborhood scope conflicts       │
│ 630                                                         │
└─────────────────────────────────────────────────────────────┘
```

```
┌─────────────────────────────────────────────────────┐
│ Retrieve a first digital map that includes a base   │
│ map and a first augmentation to a map element       │
│                      705                            │
└─────────────────────────────────────────────────────┘
                          │
                          ▼
┌─────────────────────────────────────────────────────┐
│            Receive a second digital map             │
│                      710                            │
└─────────────────────────────────────────────────────┘
                          │
                          ▼
┌─────────────────────────────────────────────────────┐
│ Perform a difference comparison between the first   │
│       digital map and the second digital map        │
│                      715                            │
└─────────────────────────────────────────────────────┘
                          │
                          ▼
┌─────────────────────────────────────────────────────┐
│ Determine whether the second digital map includes   │
│              the first augmentation                 │
│                      720                            │
└─────────────────────────────────────────────────────┘
                          │
                          ▼
                    ╱─────────────╲
                   ╱  Second digital ╲
          No 725  ╱   map includes    ╲ Yes 735
         ◄──────── the first          ────────►
                  ╲  augmentation?    ╱
                   ╲                 ╱
                    ╲───────────────╱

┌──────────────────────────┐     ┌──────────────────────────┐
│ Determine that second    │     │ Determine that second    │
│ digital map does not     │     │ digital map copies first │
│ copy first digital map   │     │ digital map              │
│          730             │     │          740             │
└──────────────────────────┘     └──────────────────────────┘
```

FIG. 7

EFFICIENT HANDLING OF DIGITAL MAP DATA DIFFERENCES

CROSS REFERENCE TO RELATED APPLICATIONS

This application claims the benefit of Provisional Application No. 62/797,785, filed on Jan. 28, 2019, which is incorporated herein by reference.

BACKGROUND

The present disclosure relates to handling digital map data differences.

Many digital maps are based upon a base map provided by a base map provider. For example, the base map provider gives the base map to a map editor. The map editor augments map elements of the base map to produce an augmented map. Often, base map providers update base maps, changing one or more map elements, and provide the updated base maps to map editors. For example, an updated base map may include a new road. To reflect the changes in the updated base map, the map editor merges the updated base map with the augmented map. However, conflicts can arise when differences between the augmented map and the updated base map are mutually exclusive. Attempts to alleviate such conflicts may lead to numerous false conflicts, e.g. false positives and false negatives, which may require significant computing resources or time to address.

BRIEF DESCRIPTION OF DRAWINGS

FIG. 6 illustrates a process for identifying conflicts between two maps, according to one embodiment.

FIG. 7 illustrates a process for detecting whether one map copies another, according to one embodiment.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Figure 1:
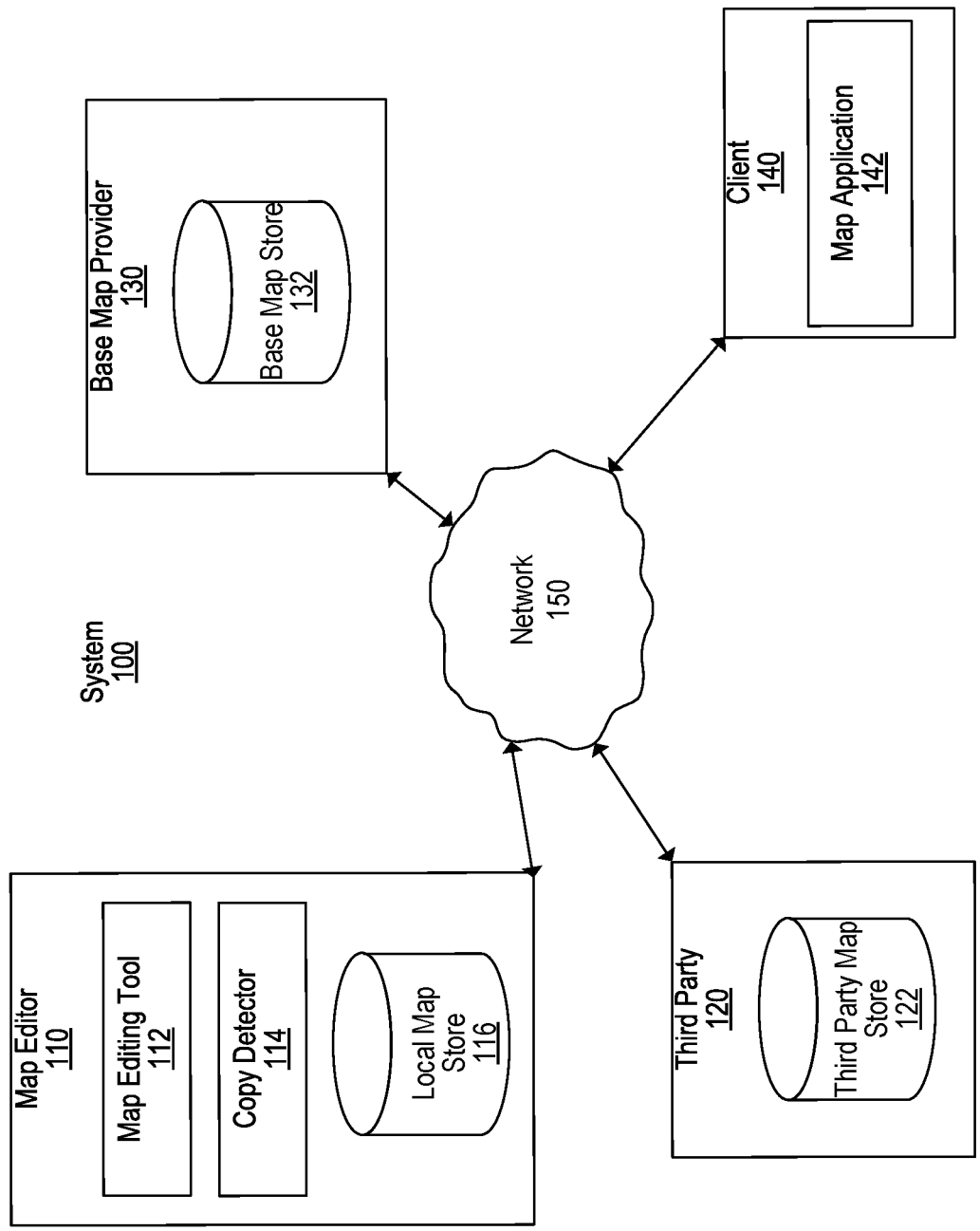
FIG. 1 is a block diagram that illustrates a system, according to one embodiment.

FIG. 1 is a block diagram of a system 100 in which the techniques described herein may be practiced, according to an embodiment. The system 100 includes a map editor 110, a third party 120, a base map provider 130, a client 140, and a network 150. In other embodiments the system 100 may include fewer, other, or additional modules than those described herein, such as additional clients 140, or without third party 120 and client 140. Furthermore, various modules and functionality described herein may be incorporated into other modules within the system 100 in other embodiments.

Digital maps represent geographic information of a geographic area via digital map data. Different digital maps include different digital map data. The digital map data for a digital map includes various map elements. Map elements represent aspects of the geographic information of the geographic area represented by the digital map. For example, map elements may be representations of roads, buildings, borders, natural features such as trees and mountains, and other geographic information, and may additionally include textual or visual aspects, such as a graphical component illustrating a map element, a label for the map element, and so on. Map elements vary by type, such as map elements representing roads (road map elements), or map elements representing buildings (building map elements). Map elements have one or more attributes, which are features of the map elements that may vary among map elements of similar type. For example, road map elements may include a length attribute, a width attribute, an elevation attribute, a number of lanes attribute, a directionality attribute, a steepness attribute, a speed limit attribute, a name attribute, etc. Different types of map elements may have different sets of attributes.

The map editor 110 is a computing device, such as a personal computer, that can edit digital maps, such as base maps. The map editor 110 may be part of an enterprise, such as a business or other organization that creates or alters digital maps. A base map is a standardized digital map that has not been customized, such as a map that has not been edited by entities other than the base map provider 130. The map editor 110 may receive a base map from the base map provider 130 and edit the base map using the map editing tool 112, altering the base map's digital map data and thereby producing an augmented map. Alterations to a digital map may include adding or removing a map element, altering an attribute of a map element, and any other changes to the digital map's digital map data. Alterations to a digital map may be called augmentations. For example, the map editor 110 may edit a base map to add a new road map element, producing an augmented map that includes more accurate geographic information than the base map (where the more accurate geographic information is the augmentation, i.e. the new road map element). As a second example, the map editor 110 may remove a type of map element, such as all building map elements, to produce an augmented map that is simplified as compared to the base map. The map editor 110 may distribute augmented maps, such as to the client 140. In addition to editing digital maps, the map editor 110 can also check whether one digital map copies another, as described below. The map editor 110 includes a map editing tool 112, a copy detector 114, and a local map store 116.

The map editing tool 112 edits digital maps, such as base maps or augmented maps, and can merge two or more digital maps. The map editing tool 112 can access, alter, and add digital map data to the local map store 116. The map editing tool 112 can perform difference comparisons between digital maps. In an embodiment, the map editing tool 112 generates a user interface and sends the user interface for display to a display of the map editor 110. Via the user interface, a user of the map editor 110 may edit a digital map, merge two or more digital maps, or otherwise instruct the map editor 110. The user interface may be a graphical user interface (GUI) or a command line interface (CLI). The map editing tool 112 is described in greater detail below with reference to FIG. 2.

The copy detector 114 determines whether one digital map copies the augmentations and/or updates of another digital map. The copy detector 114 may perform a difference comparison between two digital maps, similar to the difference comparison performed by the map editing tool 112. Alternatively, the copy detector 114 may operate in conjunction with the map editing tool 112 to perform a difference comparison, e.g. use the difference comparison functionality of the map editing tool 112. The copy detector 114 evaluates the results of a difference comparison between a first digital map and a second digital map, e.g. a set of changes including differences between the maps, to determine whether the second digital map copies the first digital map. The evaluation may involve comparing the set of changes to a set of augmentations to the first map and determining whether the set of changes includes any of the augmentations in the set of augmentations. As described below, augmentations may be identified by flags or other indicators in the digital map data.

If the set of changes includes augmentations in the set of augmentations, the copy detector 114 determines that the second digital map does not include the augmentations in the set of augmentations, as the augmentations were not found in the second digital map and therefore were flagged in the set of changes. As such, the copy detector 114 determines that the second digital map does not copy the first digital map. If the set of changes does not include one or more of the augmentations in the set of augmentations, the copy detector 114 determines that the second digital map includes the augmentations in the set of augmentations, as the difference comparison did not flag the augmentations as a change when compared to the second digital map. As such, the copy detector 114 determines that the second digital map copies at least one augmentation from the set of augmentations, and therefore copies the first digital map.

The local map store 116 stores digital map data and may be, for example, a relational or non-relational database. Other components of the map editor 110, such as the map editing tool 112, may communicate with the local map store 116 to read data recorded in the local map store 116 or to write to the local map store 116, thereby adding, removing, or changing data in the local map store 116.

The third party 120 is a computing device, such as a personal computer, that can store digital maps. In an embodiment, the third party 120 is a map editor 110. The third party 120 includes a third party map store 122 that stores digital map data, such as digital maps that copy augmented maps created by the map editor 110. The third party 120 may be part of an enterprise, such as a business or other organization, that competes with the enterprise of the map editor 110.

The base map provider 130 is a computing device, such as a personal computer, that can store digital maps. In an embodiment, the base map provider 130 is a map editor 110. The base map provider 130 includes a base map store 132 that stores digital map data, such as base maps. The base map provider 130 distributes a base map to the map editor 110. For example, the base map provider 130 may be a governmental entity, such as the United States Census Bureau, which provides the Topologically Integrated Geographic Encoding and Referencing (TIGER) map, or the Ordinance Survey in the United Kingdom, which provides the British National Grid (BNG). Alternatively, the base map provider 130 may be an open source project, such as OPENSTREETMAP, or an enterprise that provides a proprietary digital map. The base map provider 130 may update base maps and distribute updated base maps to map editors 110 and/or third parties 120. Updated base maps include at least one update to a map element in the base map. An update is an augmentation to a base map by the base map provider 130.

The client 140 is a computing device, such as a personal computer. The client 140 includes a map application 142, which is a service that uses digital maps. The client 140 receives digital maps from the map editor 110 and uses them via the map application 142. The map application 142, for example, may be a navigation service.

The network 150 enables communications among the map editor 110, the third party 120, the base map provider 130, and the client 140, and can comprise the Internet as well as mobile telephone networks. In one embodiment, the network 150 uses standard communications technologies and/or protocols. The data exchanged over the network 150 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The messages exchanged by the clients 110 can also be encrypted. The entities can use custom and/or dedicated data communications technologies instead of, or in addition to, the ones described above.

Figure 2:
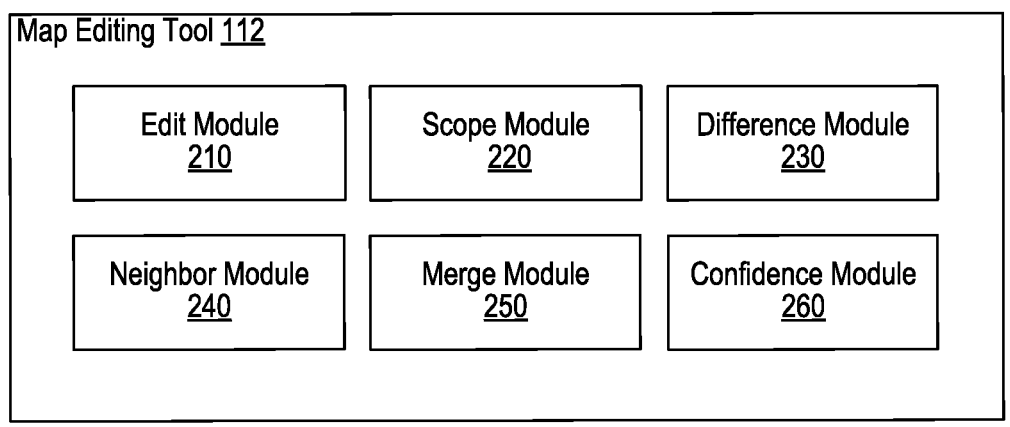
FIG. 2 is a block diagram that illustrates a map editing tool, according to one embodiment.

FIG. 2 is a block diagram that illustrates the map editing tool 112, according to one embodiment. The map editing tool 112 includes an edit module 210, a scope module 220, a difference module 230, a neighbor module 240, a merge module 250, and a confidence module 260.

The edit module 210 changes digital map data, e.g. augments a digital map, and creates new digital map data, e.g. creates a new digital map. The edit module 210 may alter one or more attributes of one or more map elements of a digital map and add or remove one or more map elements to or from a digital map. The edit module 210 may alter a digital map schema of a digital map. The digital map schema of a digital map is the structure of the digital map data of the digital map. This includes the types of map elements included in the digital map, the particular attributes included for each type of map element, and so on. The edit module 210 may change a digital map schema, such as adding or removing an attribute from a type of map element. For example, the edit module 210 may edit a digital map including road map elements with a "name" attribute in English to add a "Mandarin name" attribute that labels the road map elements in Mandarin. The edit module 210 can export digital maps, e.g. send an augmented map to the client 140.

The scope module 220 evaluates changes, removals, or additions (henceforth, simply "changes") to the digital map data of a digital map, e.g. changes made by the edit module 210, and determines a scope of each change. In particular, each time the edit module 210 makes a change to a digital map, the scope module 220 determines whether the change has a local scope or a neighborhood scope. Local scope changes affect solely the map element that is changed. In contrast, a neighborhood scope change affects not only the map element that is actually changed, but also potentially affects one or more neighboring map elements. Neighboring map elements are discussed in further detail below with reference to the neighbor module 240. The scope module 220 may set a flag for each changed map element indicating the scope of the change. The flag may additionally indicate details of the change, e.g. which digital map data, such as attributes of the map element, are altered.

In an embodiment, rather than determining the scope of changes each time an edit is made, the scope module 220 performs batch scope determinations, where the scope of multiple changes are determined by the scope module 220 after each of the multiple changes have been made. For example, the scope module 220 may perform batch scope determinations periodically, where each batch scope determination determines a scope for each change made since a most recent batch scope determination.

The scope module 220 may determine whether a change is of local or neighborhood scope by identifying which attributes are changed and comparing the identified attribute changes to one or more lists of local and/or neighborhood scope changes. For example, the scope module 220 may determine that a change is to a name attribute of a road map element, and determine whether changes to name attributes of road map elements are in a list of local scope changes or a list of neighborhood scope changes. Alternatively, the scope module 220 may use one list for one type of change, e.g., of local scope changes. If a change is in the one list, the scope module 220 identifies it as having the scope indicated by the list, whereas if the change is not in the one list, the scope module 220 identifies it as having the scope not indicated by the list.

In an embodiment, local scope changes include changes to name attributes, street address attributes, speed limit attributes, postal code attributes, steepness attributes, and curb attributes (e.g., whether the curb is plain, red, yellow, a bus stop, or so on), and may additionally include lane attributes including a number of lanes, lane connectivity, and lane usage. In an embodiment, neighborhood scope changes include changes to road geometry attributes, directionality attributes, and turn restriction attributes. A road geometry attribute is the geographic dimensions of a road. A directionality attribute is the direction of traffic upon the road. A turn restriction attribute is a restriction upon whether traffic upon one road can turn onto another road at a particular intersection. A lane attribute is a number of lanes in a road. Turn restriction attributes may depend upon lane attributes and/or directionality attributes, and may include different turn restrictions for different lanes in a road. Depending upon the embodiment, there may be different local scope changes and/or neighborhood scope changes than those described herein. In an embodiment, the addition or removal of a map element is a neighborhood scope change.

The difference module 230 identifies differences between a first digital map and a second digital map. The difference module 230 may identify the differences by comparing the digital map data of the first and second digital maps. The difference module 230 can produce a set of changes, where each change in the set of changes is a difference between the two digital maps. In an embodiment, the difference module 230 identifies flags (e.g., those created by the scope module 22) within the digital map data of each of the first and second digital maps and compares the flags. If either of the first or second digital map includes a flag not included in the other, the flagged map element is identified as a change and the difference module 230 adds it to the set of changes.

Alternatively, the difference module 230 may produce a set of conflicts. A conflict is an augmentation to the first map and an update to the second map that are mutually exclusive and/or overlapping. For example, if the augmentation and the update both change a "name" attribute of a road map element to different names, there is a conflict at that map element. Though described herein as mutually exclusive augmentations and updates, conflicts may be two mutually exclusive augmentations (e.g. one in each of two augmented maps) in alternative embodiments. The difference module 230 may identify conflicts by comparing each augmentation and update to one another.

The difference module 230 identifies conflicts differently depending upon the scope of the changes (augmentations or updates) that produce the conflict. The difference module 230 identifies two local scope changes as conflicting when both are to the same attribute of the same map element. Otherwise, the two local scope changes do not conflict. The difference module 230 identifies two neighborhood scope changes as conflicting if there is an intersection of neighbors of the augmentation and the update. The difference module 230 identifies the neighbors of each map element with a neighborhood scope change (e.g. the augmentation and the update) and if these map elements share a neighbor the difference module 230 identifies the augmentation and the update as a conflict. Otherwise, the difference module 230 determines that the augmentation and the update do not conflict. As described below, changes that do not conflict may be automatically merged.

The neighbor module 240 determines whether a first map element and a second map element are neighbors. Depending upon the embodiment, the neighbor module 240 performs the determination using any of a variety of techniques. Two such techniques are geometry-based neighbor determination and graph connectivity-based neighbor determination. The neighbor module 240 may implement one or both of these techniques.

Geometry-based neighbor determination involves determining whether the respective centroid points of two map elements are within a certain threshold distance. If the centroid points are within a threshold distance of one another, the two map elements are determined to be neighbors by the neighbor module 240. If the centroid points are not within a threshold distance of one another, the neighbor module 240 determines that the two map elements are not neighbors. A centroid point of a map element is the geographic center of the geographic feature represented by the map element. The centroid point may be an attribute of the map element or may be determined by the neighbor module 240 based on other geographic information included in the map element, such as a geometry attribute including coordinates indicating the centroid point. Geometry-based neighbor determination is described in greater detail below with reference to FIG. 4A.

Graph connectivity-based neighbor determination involves constructing an undirected graph based on digital map data and determining whether nodes representing map elements are reachable from one another within a threshold number of edges of the graph. The neighbor module 240 constructs the undirected graph using the digital map data of a digital map, where some or all map elements are nodes, some of which are connected by edges. Two nodes have a connecting edge if the corresponding map elements are positioned adjacent to one another in the digital map. In an alternate embodiment, two nodes have a connecting edge if there is a reference between the map elements in the digital map data. For example, a turn restriction map element references one or more edges (road map elements) that are part of the turn restriction.

To determine whether two map elements are neighbors, the neighbor module 240 identifies a shortest path through the graph from one node to another, where each node represents one of the two map elements, and evaluates the shortest path. If there is not a path, the two map elements are not neighbors. If the path includes more than a threshold number of edges, the two map elements are not neighbors. In an embodiment, the threshold number of edges is set by an implementer of the neighborhood module 240. If the path includes the threshold number of edges or less, the two map elements are neighbors. Graph connectivity-based neighbor determination is described in greater detail below with reference to FIG. 4B.

The merge module 250 combines two digital maps into one digital map, such as an augmented map and an updated base map into an updated augmented map that incorporates augmentations from the augmented map and updates from the updated base map. For augmentations and updates that do not conflict with other augmentations or updates, the merge module 250 incorporates the augmentations and updates into the digital map automatically. If an augmentation and an update conflict, the merge module 250 incorporates one or the other based on preconfigured settings or based on received user input. For example, the merge module 250 may be configured such that augmentations are incorporated rather than updates when there are conflicts, or vice versa. Alternatively, the merge module 250 handles conflicts in response to user input. For example, the merge module 250 may begin combining two digital maps by performing a difference comparison for the two digital maps, e.g. in conjunction with the functionality of the difference module 230, to produce a set of conflicts. The merge module 250 may then request user input for each conflict in the set of conflicts. Then, for each conflict in the set of conflicts, user input is received by the merge module 250 indicating whether to implement the augmentation or the update for that conflict, and the merge module 250 incorporates into the updated augmented map the augmentation or the update based on which is indicated by the user input.

The confidence module 260 generates confidence scores for neighborhood-scope conflicts identified by the difference module 230. A confidence score is a numerical value representing a likelihood that an augmentation and an update conflict. The greater the confidence score, the more likely the augmentation and the update conflict. Confidence scores may be included in sets of conflicts, such as when reporting sets of conflicts at the user interface. Confidence scores are discussed in greater detail below with reference to FIGS. 4A-B.

Figure 3A:
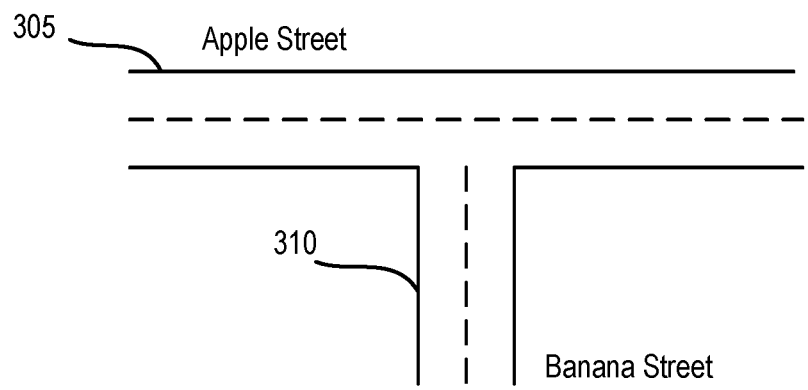
FIG. 3A illustrates local scope changes to a digital map, according to one embodiment.

FIG. 3A illustrates local scope changes to a digital map, according to one embodiment. As described above, a local scope change only affects the map element that is changed, and does not impact neighboring map elements. Street 305 and street 310 are road map elements. Each includes a "name" attribute. Changes to name attributes are local scope changes, as they do not affect neighboring map elements. Street 305 has name attribute "Apple Street" and street 310 has name attribute "Banana Street." If the map editor 110 changes the name attribute of street 305 from "Apple Street" to "Carrot Street," the change only affects street 305. No attribute of street 310 changes due to street 305 changing name attributes from "Apple Street" to "Carrot Street."

Figure 3B:
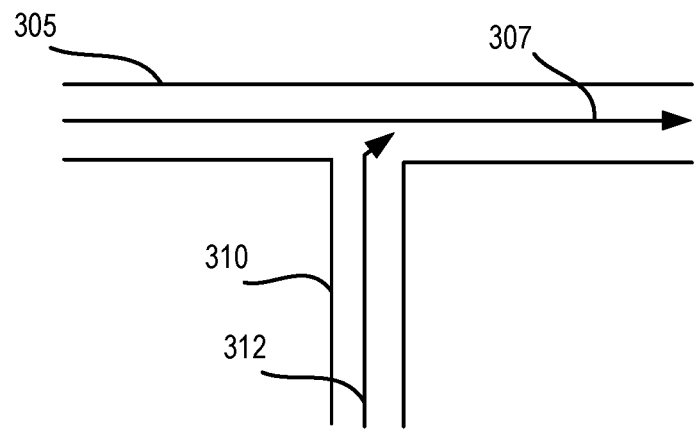
FIGS. 3B-C illustrate neighborhood scope changes to a digital map, according to one embodiment.
Figure 3C:
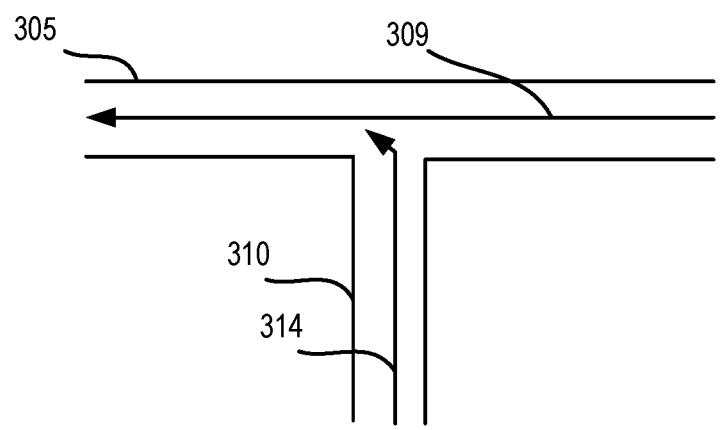

FIGS. 3B-C illustrate neighborhood scope changes to a digital map, according to one embodiment. As described above, a neighborhood scope change affects both the map element that is changed and potentially one or more map elements that neighbor the changed map element. Street 305 and street 310 are one-way roads in FIGS. 3B-C, and each includes a "directionality" attribute. Additionally, street 310 has a "turn restriction" attribute. In FIG. 3B, street 305 has directionality 307, which is left-to-right, such as West to East. Similarly, street 310 has directionality 312, which is down-to-up, such as South to North. Street 310 intersects street 305 perpendicularly. At the intersection, street 310 has a turn restriction onto street 305 that is exclusively to the right, as represented by the arrowhead of directionality 312.

If the map editor 110 changes the directionality attribute of street 305 from directionality 307 to directionality 309, as in FIG. 3C, the change is a neighborhood scope change—it affects more than just street 305. Directionality 309 is the opposite of directionality 307, and is right-to-left, such as East to West. Changing the directionality attribute of street 305 from directionality 307 to directionality 309 also affects street 310, as the turn restriction of street 310 can no longer be exclusively to the right onto street 305 at the intersection—this would be a turn into traffic, rather than with traffic. As such, the turn restriction attribute of street 310 changes to be exclusively to the left, as represented by the arrowhead of directionality 314. As such, the change to street 305 was a neighborhood change, as it affected both the changed map element and a neighboring map element.

FIG. 4 uses like reference numerals to identify like elements. A letter after a reference numeral, such as "410A," indicates that the text refers specifically to the element having that particular reference numeral. A reference numeral in the text without a following letter, such as "410," refers to any or all of the elements in the figures bearing that reference numeral. For example, "410" in the text refers to reference numerals "410A" and/or "410B" in the figures.

Figure 4A:
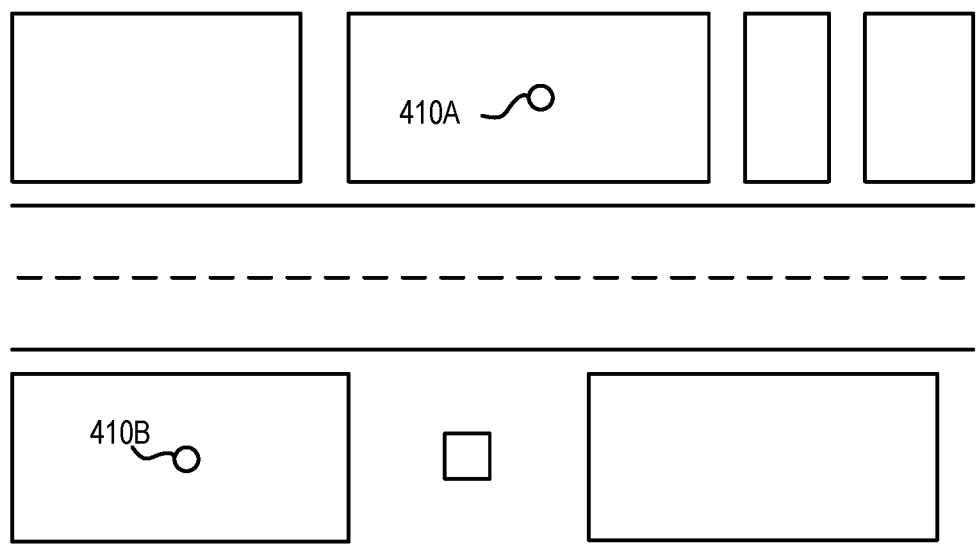
FIG. 4A illustrates geometry-based neighbor determination, according to one embodiment.

FIG. 4A illustrates geometry-based neighbor determination, according to one embodiment. FIG. 4A includes a road map element and several building map elements within a digital map. Centroid point 410A indicates the geographic center of a first building map element and centroid point 410B indicates the geographic center of a second building map element. As described above, for geometry based neighbor determination, two map elements are neighbors if their respective centroid points 410 are within a certain threshold distance. Thus, to determine whether the first and second building map elements are neighbors, the map editing tool 112 determines the Euclidean distance between centroid points 410A,B and compares it to a threshold. If the Euclidean distance is greater than the threshold, the map editing tool 112 identifies the centroid points 410A,B as not being neighbors, and if the Euclidean distance is less than the threshold, the map editing tool 112 identifies the centroid points 410A,B as neighbors. In an alternative embodiment, the distance measurement may be non-Euclidean, such as to more accurately model Earth geometry. For example, the map editing tool 112 may instead determine the distance between centroid points using Haversine distance, or using a spatial index to determine whether geometries overlap. The threshold may be pre-determined and retrieved by the map editing tool 112, or may be configured by the map editing tool 112, such as based on user input to the map editor 110.

In an embodiment, rather than determining whether the first and second building map elements are neighbors based on the Euclidean distance between the centroid points 410A, B, the map editing tool 112 determines a confidence score Cs for whether a change to the first building map element produces a conflict with the second building map element:

$$C_S = \frac{\text{Factor}}{\text{Distance}}$$

where Factor is a constant and Distance is the distance between the centroid points 410A,B. Factor may be preconfigured or set by the map editing tool 112, such as based on user input. Based on Cs, the map editing tool 112 determines whether to label the change to the first building map element as a conflict with the second building map element. For example, if Cs is greater than a threshold score, the map editing tool 112 identifies the change to the first building map element as a conflict and adds the conflict to a set of conflicts, while if Cs is less than the threshold score, the map editing tool 112 does not identify the change to the first building map element as a conflict and does not add the conflict to the set of conflicts. The factor and the threshold score may be set by an implementer of the map editing tool 112.

Figure 4B:
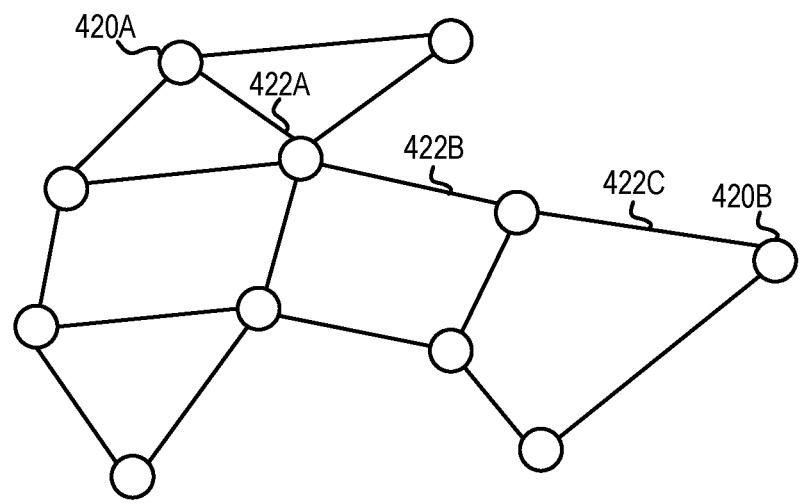
FIG. 4B illustrates graph connectivity-based neighbor determination, according to one embodiment.

FIG. 4B illustrates graph connectivity-based neighbor determination, according to one embodiment. FIG. 4B includes an undirected graph comprising eleven nodes 420 connected by edges. As described above, the map editing tool 112 constructs a graph from digital map data. Each node 420 represents a map element and each edge represents a connection between two nodes 420. In an embodiment, two nodes 420 are connected if they share a geographic border, e.g. a road map element and a building map element located adjacent to the road map element. In an embodiment, connectivity is a map element attribute that indicates other map elements connected to the map element.

As described above, for graph connectivity-based neighbor determination, two map elements are neighbors if their respective nodes 420 are reachable from one another within a threshold number of edges. For example, nodes 420A and 420B are reachable from one another by various paths through the graph. The path with the fewest number of edges has three edges 422A-C. If the threshold number of edges is, for example, four, then the nodes 420A,B are neighbors, while if the threshold number of edges is, for example, two, then the nodes 420A,B are not neighbors. The threshold may be pre-determined and retrieved by the map editing tool 112, or may be configured by the map editing tool 112, such as based on user input to the map editor 110.

In an embodiment, rather than determining whether the nodes 420A,B are neighbors based on a number of edges from node 420A to node 420B, the map editing tool 112 determines a confidence score Cs for whether a change to the map element represented by node 420A produces a conflict with the map element represented by node 420B:

$$C_S = \frac{\text{Factor}}{\text{Edge Count}}$$

where Factor is a constant and Edge Count is the number of edges from node 420A to node 420B. Factor may be preconfigured or set by the map editing tool 112, such as based on user input. Based on Cs, the map editing tool 112 determines whether to label the change to the map element represented by node 420A as a conflict with the change to the map element represented by node 420B. For example, if Cs is greater than a threshold score, the map editing tool 112 identifies a conflict and adds the conflict to a set of conflicts, while if Cs is less than the threshold score, the map editing tool 112 does not identify a conflict and does not add the conflict to the set of conflicts. The factor and the threshold score may be set by an implementer of the map editing tool 112.

In an embodiment, the map editing tool 112 uses graph connectivity-based neighbor determination except for changes to geometry attributes, for which the map editing tool 112 uses geometry-based neighbor determination. In other embodiments the map editing tool 112 may use both graph connectivity-based neighbor determination and geometry-based neighbor determination for different sets of attributes.

Figure 5A:
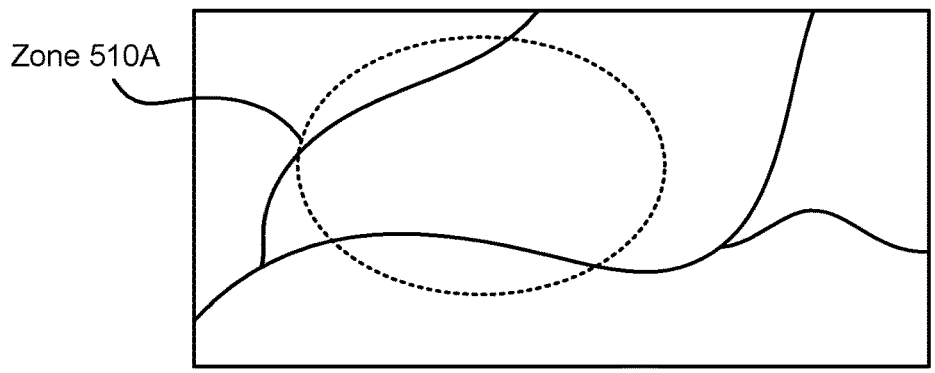
FIGS. 5A-D illustrate detection of one map copying another, according to one embodiment.
Figure 5B:
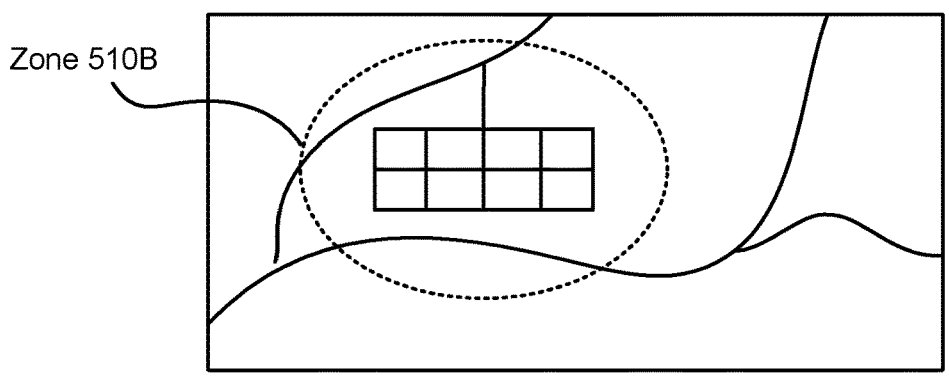

FIGS. 5A-D illustrate detection of one map copying another, according to one embodiment. Each of FIGS. 5A-D illustrates a geographic area that includes a zone 510. FIG. 5A illustrates a base map, where zone 510A is empty save for parts of a road network. FIG. 5B illustrates a first augmented map that is an edited version of the base map in FIG. 5A. The first augmented map of FIG. 5B is created by the map editor 110. Zone 510B includes the augmentation, which is a new parking lot map element. The parking lot map element in the first augmented map has a detailed parking lot including a grid of parking spaces, as well as a simple, straight road connecting the parking lot to the road network.

Figure 5C:
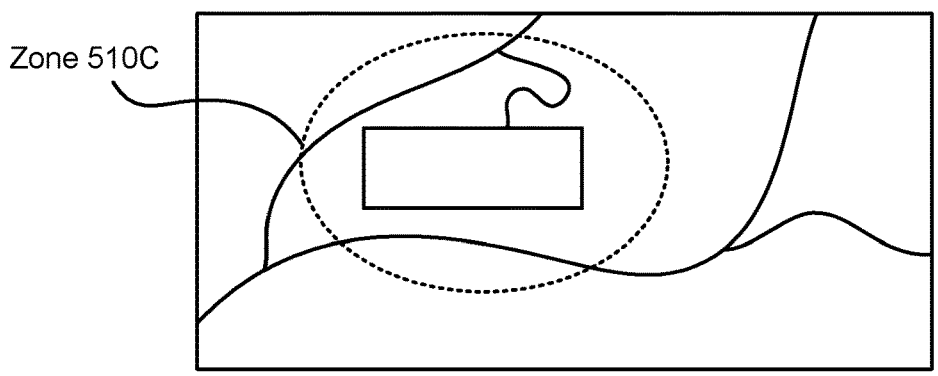

FIG. 5C illustrates a second augmented map that is a different augmented version of the base map in FIG. 5A. The second augmented map of FIG. 5C is created by the third party 120. Zone 510C has a simple parking lot without a grid of parking spaces, but a detailed road with several twists connecting the parking lot to the road network. As such, the first augmented map and the second augmented map are noticeably different, the former including a detailed parking lot but a simple road, the latter including a simple parking lot but a detailed road.

Figure 5D:
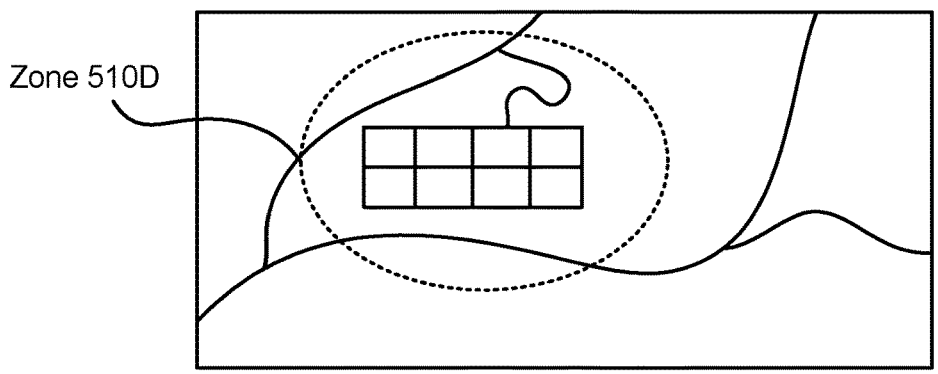

FIG. 5D illustrates the third party 120 copying the first augmented map of the map editor 110. The figure includes an updated version of the second augmented map, with Zone 510D. Zone 510D includes both the detailed parking lot map element of the first augmented map and the detailed road map element of the second augmented map. As such, the third party 120 has copied the parking lot map element from the first augmented map of the map editor 110.

The copy detector 114 of the map editor 110 can detect that the updated version of the second augmented map copies the first augmented map of the map editor 110. As described above, the copy detector 114 can determine that the updated version of the second augmented map in FIG. 5D includes the augmentations of both the first augmented map and the second augmented map via a difference comparison. If the copy detector 114 performs a difference comparison between the updated version of the second augmented map in FIG. 5D and the first augmented map in FIG. 5B, the difference comparison will indicate that the road map element is different but the parking lot map element is the same. Because the parking lot map element augmentation was created by the map editor 110 and it is present in the updated version of the second augmented map created by the third party 120, the copy detector 114 determines that the updated version of the second augmented map copies the first augmented map. This indicates that the third party 120 copied the map editor 110.

FIG. 6 illustrates a process 600 for identifying conflicts between two maps, according to one embodiment. The map editor 110 retrieves 605 an augmented map that includes a base map, an augmentation to a map element, and a flag for the augmentation indicating a scope of the augmentation. This may involve the map editor 110 augmenting the base map, e.g. making a change to the map element, determining whether the change has local scope or neighborhood scope, and setting a flag for the change indicating the determined scope. The augmented map may include more than one augmentation, which may be to more than one map element, in other embodiments. In such embodiments, difference comparisons and/or conflict detection may be performed in batches, which may be periodic.

The map editor 110 receives 610 an updated base map that includes the base map and an update to a map element. The updated map element may or may not be the same map element as the augmented map element in the augmented map. Depending upon the embodiment, the updated map may include more than one update, which may be to more than one map element.

The map editor 110 performs 615 a difference comparison between the augmented map and the updated base map based on the flag. Using the flag, the map editor 110 identifies the augmented map element and which attribute of the augmented map element is augmented, as well as a scope of the augmentation. The map editor 110 compares the augmented map element to its counterpart in the updated base map and determines whether they produce a conflict.

If the scope of the augmentation is local scope, the map editor 110 checks whether the updated base map includes an update to the same attribute of the same map element as the augmentation in the augmented map. If the update to the base map and the augmentation in the augmented map are to the same attribute of the same map element, the map editor 110 determines 620 the update to the map element and the augmentation to the map element as a local scope conflict. The map editor 110 adds the determined 620 local scope conflict to a set of local scope conflicts. If the update to the base map and the augmentation in the augmented map are not to the same attribute of the same map element, the map editor 110 does not determine a conflict, and implements both the update and the augmentation.

If the scope of the augmentation is neighborhood scope, the map editor 110 determines whether the augmented map element is neighbors with any updated map elements in the updated base map. The map editor 110 determines whether map elements are neighbors using either geometry-based neighbor determination or graph connectivity-based neighbor determination, depending upon the embodiment. If the augmented map element is neighbors with one or more updated map elements, the map editor 110 determines 625 the update to the map element and the augmentation to the map element as a neighborhood scope conflict. The map editor 110 adds the determined 625 neighborhood scope conflict to a set of neighborhood scope conflicts. If the update to the base map and the augmentation in the augmented map are not to neighboring map elements, the map editor 110 does not determine a conflict. In an embodiment, the map editor 110 produces a confidence score for neighborhood scope conflicts and records the confidence scores in the set of neighborhood scope conflicts.

The map editor 110 assembles 630 an overall set of conflicts based on the set of local scope conflicts and the set of neighborhood scope conflicts. This may include combining the set of local scope conflicts and the set of neighborhood scope conflicts into a singular set. The map editor 110 may label each conflict in the set of conflicts as either a local or a neighborhood scope conflict. The map editor 110 may use the assembled 630 set of conflicts to inform a merge of the augmented map and the updated base map. For example, if the assembled 630 set of conflicts is an empty set, the map editor 110 may proceed to automatically merge the augmented map and the updated base map to produce an updated augmented map that includes both the augmentations of the augmented map and the updates of the updated base map.

In an embodiment, the map editor 110 sends the assembled 630 set of conflicts for display, such as at the user interface generated by the map editing tool 112. The map editor 110 may then receive input from a user and merge or not merge the updated base map and the augmented map based on the user input. For example, the user input may indicate to not proceed with the merge, and the map editor 110 does not merge the augmented map and updated base map. Alternatively, the user input may indicate for each conflict whether to accept the augmentation or the update, and may additionally indicate other changes to make, such as to other map elements that are not augmented or updated but that are impacted by an augmentation or an update. Based on the user input, the map editor 110 performs the merge of the augmented map and the updated base map, keeping zero or more augmentations and zero or more updates, as well as any additional changes indicated by the user input. The map editor 110 may store the resulting updated augmented map in the local map store 116.

The techniques described herein reduce false positives and false negatives for sets of conflicts when performing difference comparisons, producing sets of conflicts including fewer false conflicts and excluding fewer true conflicts. As such, the techniques described herein produce more accurate sets of conflicts that may be used for various actions, such as merging two digital maps. Furthermore, as the sets of conflicts include fewer false positives, the sets of conflicts take fewer computing resources, e.g. processor cycles, to address. As such, the techniques described herein improve the efficiency of handling digital map data differences.

FIG. 7 illustrates a process 700 for detecting whether one map copies another, according to one embodiment. The map editor 110 retrieves 705 a first digital map that includes a base map and a first augmentation to a map element. This may involve the map editor 110 augmenting the base map, e.g. making a change to the map element, determining whether the change has local scope or neighborhood scope, and setting a flag for the change indicating the determined scope.

The map editor 110 receives 710 a second digital map. For example, the map editor 110 receives 710 a digital map from the third party 120 or the base map provider 130. Receiving 710 the second base map may involve retrieving the second digital map over the network 150, such as requesting the second digital map from the third party 120 or the base map provider 130, which then send the second digital map to the map editor 110 from either the third party map store 122 or the base map store 132. For example, the map editor 110 may download the second digital map from a website associated with the third party 120 or the base map provider 130. Alternatively, receiving 710 the second base map may involve retrieving a digital map from the local map store 116.

The map editor 110 performs 715 a difference comparison between the first digital map and the second digital map. As described above, the difference comparison involves identifying zero or more local scope changes and/or neighborhood scope changes. In particular, the map editor 110 identifies whether the second digital map includes the first augmentation. If the second digital map includes the first augmentation, the difference comparison will not indicate a change from the first digital map to the second digital map. Therefore, if the difference comparison indicates the map element in the second digital map is not different from the map element in the first digital map, it is indicative that the second digital map copied the augmentation to the map element from the first digital map.

Based on the difference comparison, the map editor 110 determines 720 whether the second digital map includes the first augmentation. If the second digital map does not 725 include the first augmentation, e.g. the difference comparison indicates a difference between the map element in the first digital map and in the second digital map, then the map editor 110 determines 730 that the second digital map does not copy the first digital map. If the second digital map does 735 include the first augmentation, e.g. the difference comparison does not indicate a difference between the map element in the first digital map and in the second digital map, the map editor 110 determines 740 that the second digital map copies the first digital map 740. In an embodiment, the map editor 110 reports determination 730 or determination 740 to the user interface at the display of the map editor 110.

Figure 8:
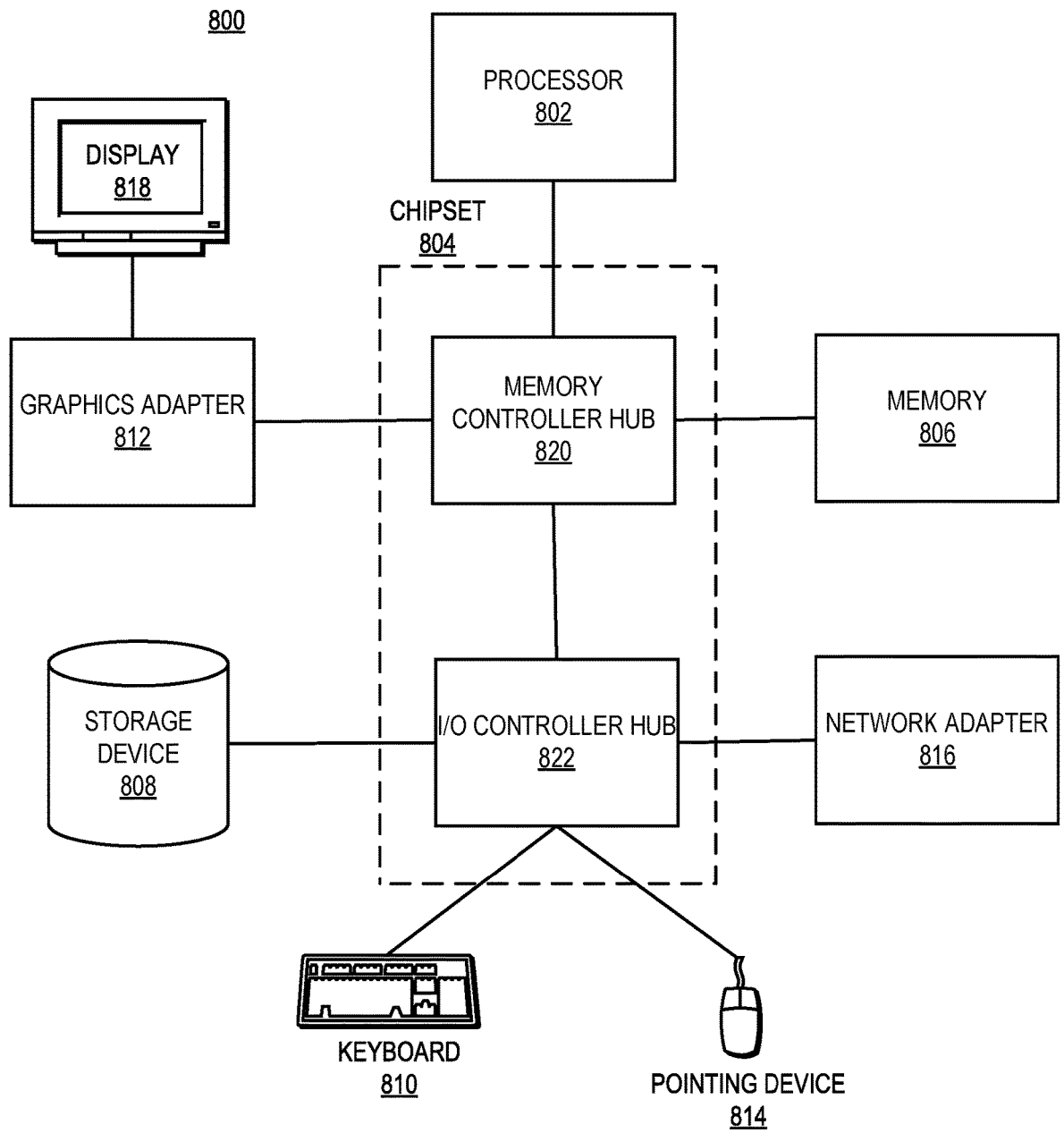
FIG. 8 is a block diagram that illustrates a computer system, according to one embodiment.

The entities shown in FIG. 1 are implemented using one or more computers. FIG. 8 is a block diagram that illustrates a computer 800, according to one embodiment. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 to the network 150.

As is known in the art, a computer 800 can have different and/or other components than those shown in FIG. 8. In addition, the computer 800 can lack certain illustrated components. For example, the computer acting as the map editor 110 can be formed of multiple blade servers linked together into one or more distributed systems and lack components such as keyboards and displays. Moreover, the storage device 808 can be local and/or remote from the computer 800 (such as embodied within a storage area network (SAN)).

Although embodiments described above are explained primarily in reference to a system 100, the embodiments may be applied to other applications such as engineering software, navigational software, and educational software. Additionally, embodiments can be applied to research applications.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for identifying differences in digital maps, the method comprising:
retrieving, by at least one processor, an augmented digital map comprising a base map, an augmentation to a first map element, and a flag for the augmentation indicating a scope of the augmentation;
receiving, by the at least one processor, an updated base map comprising the base map and an update to a second map element that corresponds to the first map element in the augmented map;
performing a difference comparison between the augmented map and the updated base map based on the scope indicated by the flag;
determining that the augmentation and the update conflict based on the difference comparison; and
assembling a set of conflicts based on the determination.

2. The method of claim 1, further comprising:
determining a confidence value indicating a probability that the augmentation and the update conflict.

3. The method of claim 1, further comprising:
determining that the scope of the augmentation is a local scope;
identifying an attribute of the first map element altered by the augmentation;
identifying an attribute of the second map element updated by the update; and
comparing the attribute of the first map element and the attribute of the second map element;
wherein determining that the augmentation and the update conflict is based on the comparison.

4. The method of claim 1, further comprising:
determining that the scope of the augmentation is a neighborhood scope;
performing a geometry-based neighbor determination for the first map element and the second map element; and
determining that the augmentation and the update conflict based on the geometry-based neighbor determination.

5. The method of claim 1, further comprising:
determining that the scope of the augmentation is a neighborhood scope;
performing a graph connectivity-based neighbor determination for the first map element and the second map element; and
determining that the augmentation and the update conflict based on the graph connectivity-based neighbor determination.

6. The method of claim 1, further comprising:
merging the augmented map and the updated base map into an updated augmented map based on the set of conflicts.

7. The method of claim 1, further comprising:
sending the set of conflicts for display;
receiving user input for each conflict in the set of conflicts; and
merging the augmented map and the updated base map into an updated augmented map based on the user input for each conflict in the set of conflicts.

8. A non-transitory computer-readable storage medium storing computer program instructions executable by a processor to perform operations for identifying differences in digital maps, the operations comprising:

retrieving an augmented map comprising a base map, an augmentation to a first map element, and a flag for the augmentation indicating a scope of the augmentation;

receiving an updated base map comprising the base map and an update to a second map element that corresponds to the first map element in the augmented map;

performing a difference comparison between the augmented map and the updated base map based on the scope indicated by the flag;

determining that the augmentation and the update conflict based on the difference comparison; and assembling a set of conflicts based on the determination.

9. The non-transitory computer-readable storage medium of claim 8, the operations further comprising:

determining a confidence value indicating a probability that the augmentation and the update conflict.

10. The non-transitory computer-readable storage medium of claim 8, the operations further comprising:

determining that the scope of the augmentation is a local scope;

identifying an attribute of the first map element altered by the augmentation;

identifying an attribute of the second map element updated by the update; and comparing the attribute of the first map element and the attribute of the second map element;

wherein determining that the augmentation and the update conflict is based on the comparison.

11. The non-transitory computer-readable storage medium of claim 8, the operations further comprising:

determining that the scope of the augmentation is a neighborhood scope;

performing a geometry-based neighbor determination for the first map element and the second map element; and determining that the augmentation and the update conflict based on the geometry-based neighbor determination.

12. The non-transitory computer-readable storage medium of claim 8, the operations further comprising:

determining that the scope of the augmentation is a neighborhood scope;

performing a graph connectivity-based neighbor determination for the first map element and the second map element; and determining that the augmentation and the update conflict based on the graph connectivity-based neighbor determination.

13. The non-transitory computer-readable storage medium of claim 8, the operations further comprising:

merging the augmented map and the updated base map into an updated augmented map based on the set of conflicts.

14. The non-transitory computer-readable storage medium of claim 8, the operations further comprising:

sending the set of conflicts for display;

receiving user input for each conflict in the set of conflicts; and merging the augmented map and the updated base map into an updated augmented map based on the user input for each conflict in the set of conflicts.

15. A system, comprising:

a processor; and a non-transitory computer-readable storage medium storing computer program instructions executable by the processor to perform operations for identifying differences in digital maps, the operations comprising:

retrieving an augmented map comprising a base map, an augmentation to a first map element, and a flag for the augmentation indicating a scope of the augmentation;

receiving an updated base map comprising the base map and an update to a second map element that corresponds to the first map element in the augmented map;

performing a difference comparison between the augmented map and the updated base map based on the scope indicated by the flag;

determining that the augmentation and the update conflict based on the difference comparison; and assembling a set of conflicts based on the determination.

16. The system of claim 15, the operations further comprising:

determining a confidence value indicating a probability that the augmentation and the update conflict.

17. The system of claim 15, the operations further comprising:

determining that the scope of the augmentation is a local scope;

identifying an attribute of the first map element altered by the augmentation;

identifying an attribute of the second map element updated by the update; and comparing the attribute of the first map element and the attribute of the second map element;

wherein determining that the augmentation and the update conflict is based on the comparison.

18. The system of claim 15, the operations further comprising:

determining that the scope of the augmentation is a neighborhood scope;

performing a geometry-based neighbor determination for the first map element and the second map element; and determining that the augmentation and the update conflict based on the geometry-based neighbor determination.

19. The system of claim 15 the operations further comprising:

determining that the scope of the augmentation is a neighborhood scope;

performing a graph connectivity-based neighbor determination for the first map element and the second map element; and determining that the augmentation and the update conflict based on the graph connectivity-based neighbor determination.

20. The system of claim 15, the operations further comprising:

sending the set of conflicts for display;

receiving user input for each conflict in the set of conflicts; and merging the augmented map and the updated base map into an updated augmented map based on the user input for each conflict in the set of conflicts.

* * * * *